(12) United States Patent
Derbeko et al.

(10) Patent No.: US 9,043,535 B1
(45) Date of Patent: May 26, 2015

(54) MINIMIZING APPLICATION RESPONSE TIME

(71) Applicant: EMC Corporation, Hopkinton, MA (US)

(72) Inventors: Philip Derbeko, Modiin (IL); Ron Bigman, Holon (IL); Anat Eyal, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 332 days.

(21) Appl. No.: 13/730,468

(22) Filed: Dec. 28, 2012

(51) Int. Cl.
*G06F 12/02* (2006.01)
*G06F 3/06* (2006.01)
*G06F 9/50* (2006.01)
*G06F 17/30* (2006.01)

(52) U.S. Cl.
CPC .......... *G06F 12/0246* (2013.01); *G06F 3/0631* (2013.01); *G06F 9/5016* (2013.01); *G06F 17/30902* (2013.01)

(58) Field of Classification Search
CPC ... G06F 3/0631; G06F 9/5011; G06F 9/5016; G06F 12/0246; G06F 13/18; G06F 17/30902; G06F 2209/5021
See application file for complete search history.

(56) References Cited

U.S. PATENT DOCUMENTS

| | | | |
|---|---|---|---|
| 2005/0027662 A1* | 2/2005 | Mayo et al. | 705/406 |
| 2008/0005522 A1* | 1/2008 | Paladini et al. | 711/170 |
| 2008/0191941 A1* | 8/2008 | Saban et al. | 342/450 |
| 2010/0312974 A1* | 12/2010 | Kikuchi | 711/154 |
| 2011/0145505 A1* | 6/2011 | Anand et al. | 711/130 |
| 2011/0239010 A1* | 9/2011 | Jain et al. | 713/310 |
| 2012/0166442 A1* | 6/2012 | Furuichi et al. | 707/740 |
| 2013/0042252 A1* | 2/2013 | Jalal et al. | 718/104 |

* cited by examiner

*Primary Examiner* — John Lane
(74) *Attorney, Agent, or Firm* — Krishnendu Gupta; Konrad R. Lee

(57) ABSTRACT

A computer-executable method, system or computer program product for providing an application aware caching solution for a data storage system including data storage devices and a pool of flash cache. The caching solution may utilize received information from users, or other components, in addition to information gathered from the data storage system to determine an optimal caching solution to provide a minimized response time from applications on the data storage system.

24 Claims, 7 Drawing Sheets

MINIMIZING APPLICATION RESPONSE TIME

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, or computer program product for managing one or more resources on a data storage system having one or more data storage devices coupled to a pool of flash cache including receiving data related to a first one of the one or more resources, analyzing the data to determine a priority for the first one of the one or more resources, and based on the determined priority, allocating an amount of flash cache from the pool of flash cache.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
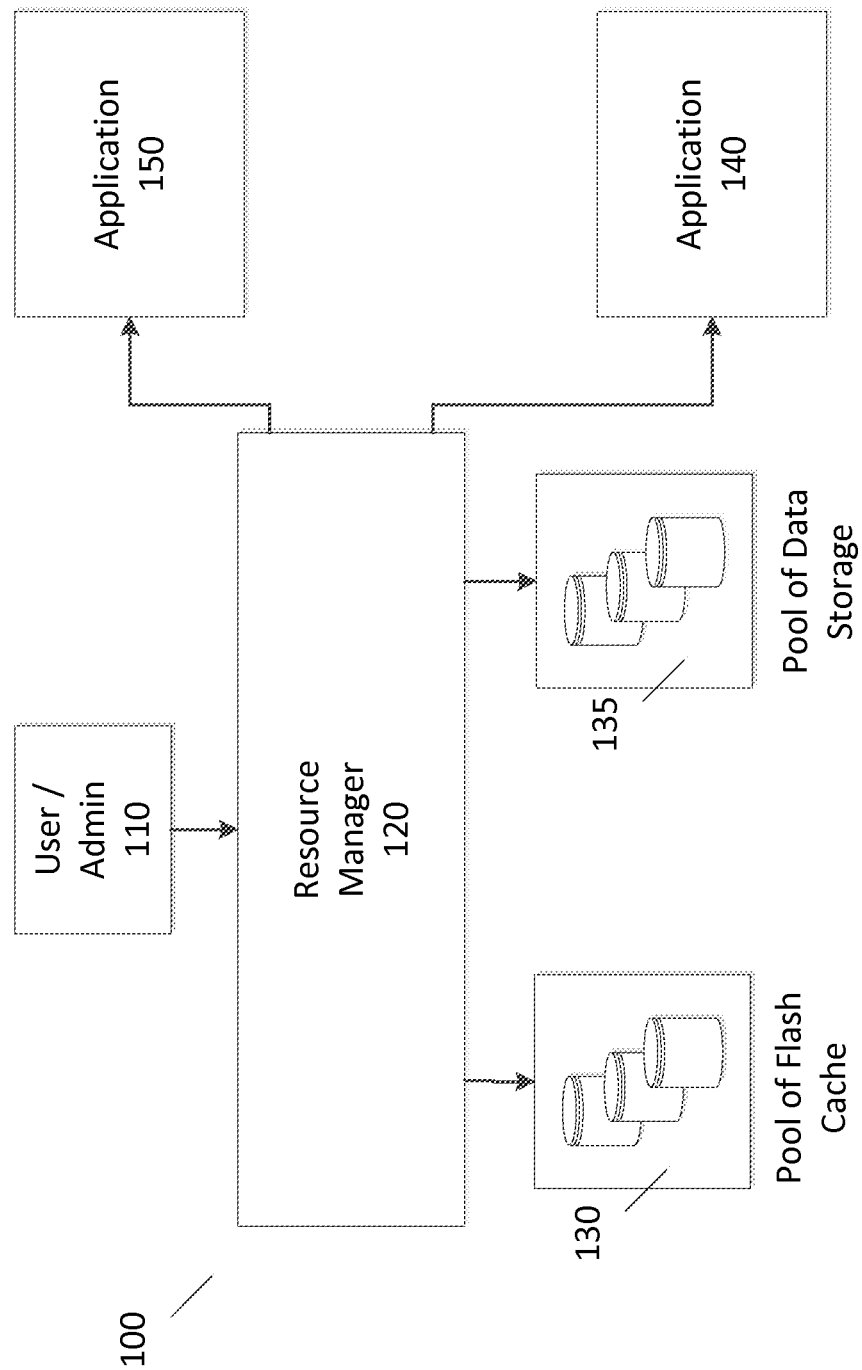
FIG. 1 is a simplified illustration of a data storage system managing flash cache and data storage, in accordance with an embodiment of the present disclosure.

Typically, managing and configuring cache resources on data storage systems may be problematic. Conventionally, data storage systems may use server caching software to determine how to allocate flash cache and data storage resources for one or more applications. Generally, caching software may be aware that data storage resources may be needed, but not aware of what is being executed and why, which makes allocating optimal resource allocation difficult. Typically, estimates made by cache algorithms may be inexact as cache algorithms may not be aware of how an application uses data storage resources and may not be aware of the actual gains in efficiency of different configurations and implementations of cache.

In many embodiments, the current disclosure may enable users and administrators to efficiently configure and allocate flash cache by providing information about a configuration of a data storage system and applications being run on the data storage system. In some embodiments, the current disclosure may enable a data storage system to include application-aware logic. In certain embodiments, the application-aware logic may provide caching software, on the data storage system, information about which applications may be important to cache at a certain time. In various embodiments, applications may include software applications, databases, and database tables. In some embodiments, the received information may include a priority or importance of the applications being run on the data storage system. In various embodiments, the received information may include a time when the priority is valid. For example, in an embodiment, an application may have a higher priority during the morning when people arrive at work while a database may have a higher priority later in the day. In some embodiments, one or more components connected to a data storage system may provide information to the data storage system.

In various embodiments, users of a data storage system may be enabled to provide importance information to the data storage system. In certain embodiments, users may be enabled to configure the relative importance or provide Service Level Agreements (SLAs) for applications located on the data storage system. In some embodiments, application-aware logic in a data storage system may aggregate user configured information to provide an importance of applications or data storage devices to cache software in the data storage system. In various embodiments, cache software may gather information about potential gains of various possible cache algorithms to determine optimal cache allocations. In certain embodiments, a cache algorithm may calculate the possible hit ratio if a higher portion of a data storage device was cached.

In some embodiments, a cache algorithm may gather data related to the calculated hit ratio. In various embodiments, a cache algorithm may combine the data related to the calculated hit ratio with the received importance information received from application-aware logic. In certain embodiments, based on the combination of the calculated hit ratio and the received importance information, the cache software may decide what applications and/or data storage resources to cache and at what specific times. For example, applications located on important data storage resources that may not receive a gain in performance from increased caching may not get a larger portion of cache. In other embodiments, applications located on less important data storage resources that may receive a gain in performance from increasing caching may receive a larger portion of cache.

In many embodiments, received information may be used to minimize response time of applications running in a data storage system. In certain embodiments, the data storage system may analyze the received information to determine an optimal allocation of flash cache for each of the applications running on the data storage system. In many embodiments, a data storage system may gather information about applications and system resources residing within the data storage system. In some embodiments, caching software may designate an application to run and be stored in allocated flash cache.

In certain embodiments, the current disclosure may enable caching software to minimize response times for applications on data storage systems. In some embodiments, the caching software may utilize one or more caching algorithms to provide application aware and optimized suggestions for allocating flash cache for applications running on the data storage system. In various embodiments, caching software may decide not to allocate flash cache because no benefit may be created by an increase in flash cache, such as a minimal or no time decrease in response time of an application.

For example, in an embodiment, caching software may use the following cache algorithm to determine whether flash cache should be allocated and, if flash cache should be allocated, an optimized amount of flash cache to allocate for an application to provide a minimize response time.

$$\text{Min}(\textstyle\sum_{Applications} \text{Importance} * \text{TotalWaitTime})$$

As shown above, in order to minimize application response time based on flash cache configurations, cache software may calculate the expected wait time for different flash cache configurations, add the application importance, and minimize the total. In this embodiment, caching software is enabled to determine a flash cache configuration that may provide a minimum response time.

In many embodiments, the current disclosure may enable a method for managing one or more resources on a data storage system having one or more data storage devices coupled to a pool of flash cache. In some embodiments, the method may include receiving data related to a first one of the one or more resources. In certain embodiments, the method may include analyzing the data to determine a priority for the first one of the one or more resources, and based on the determined priority, allocating an amount of flash cache from the pool of flash cache.

Refer to the example embodiment of FIG. 1. FIG. 1 illustrates an example embodiment of data storage system. As shown, data storage system 100 is configured to manage applications 140, 150, pool of flash cache 130, and pool of data storage 135. As shown, User/Administrator 110 is enabled to communicate with resource manager 120 to affect the allocation of pool of flash cache 130 and pool of data storage 135 for applications 150, 140. Resource manager 120 is enabled to allocate a portion of pool of flash cache 130 and/or a portion of pool of data storage to application 140 and/or application 150 respectively.

Figure 2:
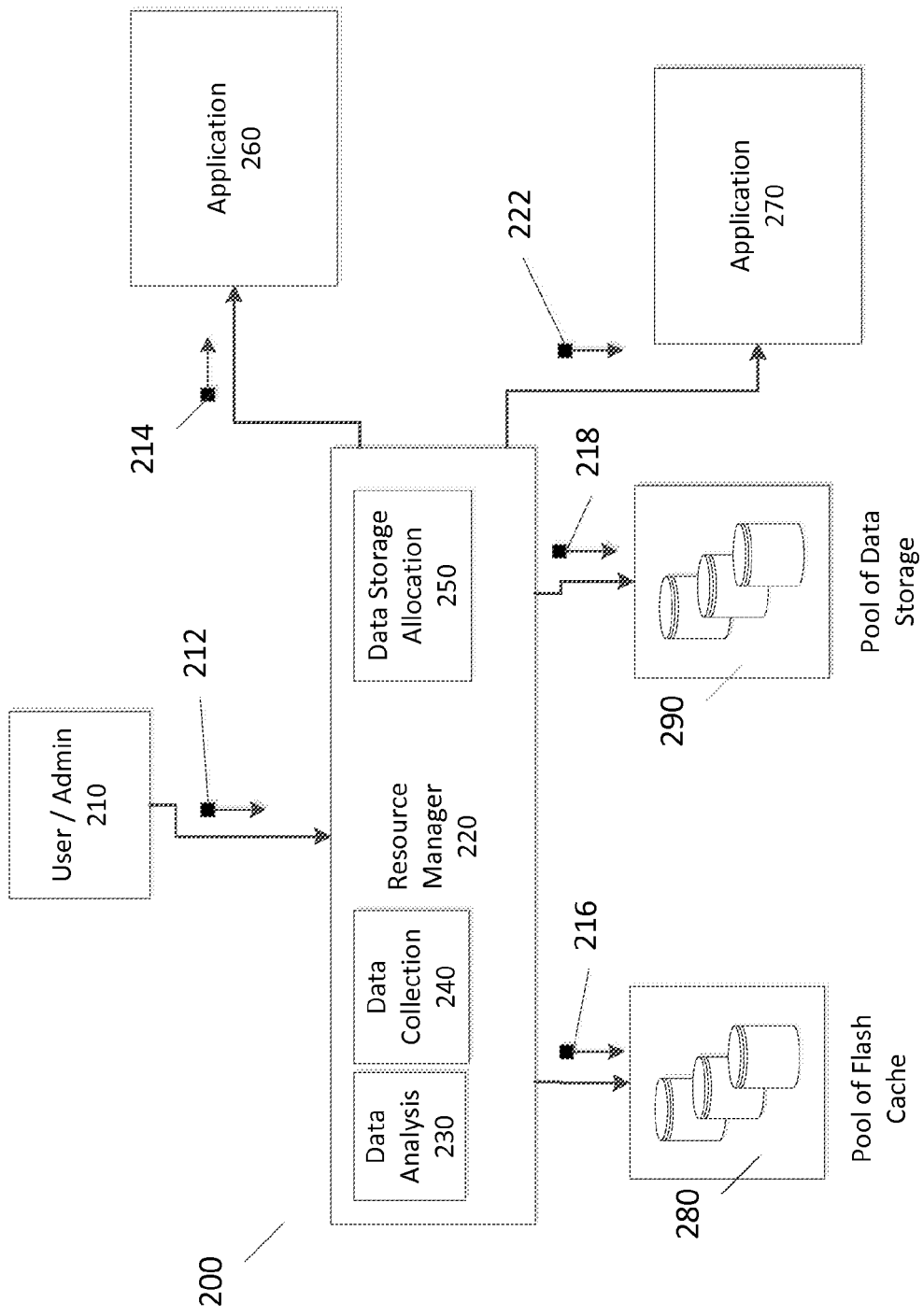
FIG. 2 is an alternative simplified illustration of a data storage system sending and receiving messages to and from components of a data storage system, in accordance with an embodiment of the present disclosure.

Refer to the example embodiment of FIG. 2. FIG. 2 illustrates an example embodiment of a data storage system. As shown, data storage system 200 is configured to manage applications 260, 270, pool of flash cache 280, and pool of data storage 290. Resource manager 220 includes data analysis 230, data collection 240, and data storage allocation 250 modules enabled to facilitate management and allocation of pool of flash cache 280 and pool of data storage 290 to applications 260, 270. In this embodiment, User/Administrator 210 communicates with resource manager 220 to manage pool of flash cache 280 and pool of data storage 290. User/administrator 210 sends message 212 to data analysis 230 module relaying priority information about applications 260, 270. As shown in FIG. 2, resource manager 220 uses data collection 240 module to gather information about data storage system 200 using messages 214, 222. Data analysis 230 module analyzes gathered information and priority information received from User/Administrator 210. Data analysis 230 module is enabled to use cache algorithms to determine an optimal allocation of flash cache and data storage for applications 260, 270. As shown, data storage allocation 350 module sends message 216 to pool of flash cache 280, and message 218 to pool of data storage 290, to allocate an amount of flash cache and an amount of data storage for Application 260 and Application 270 respectively.

Figure 3:
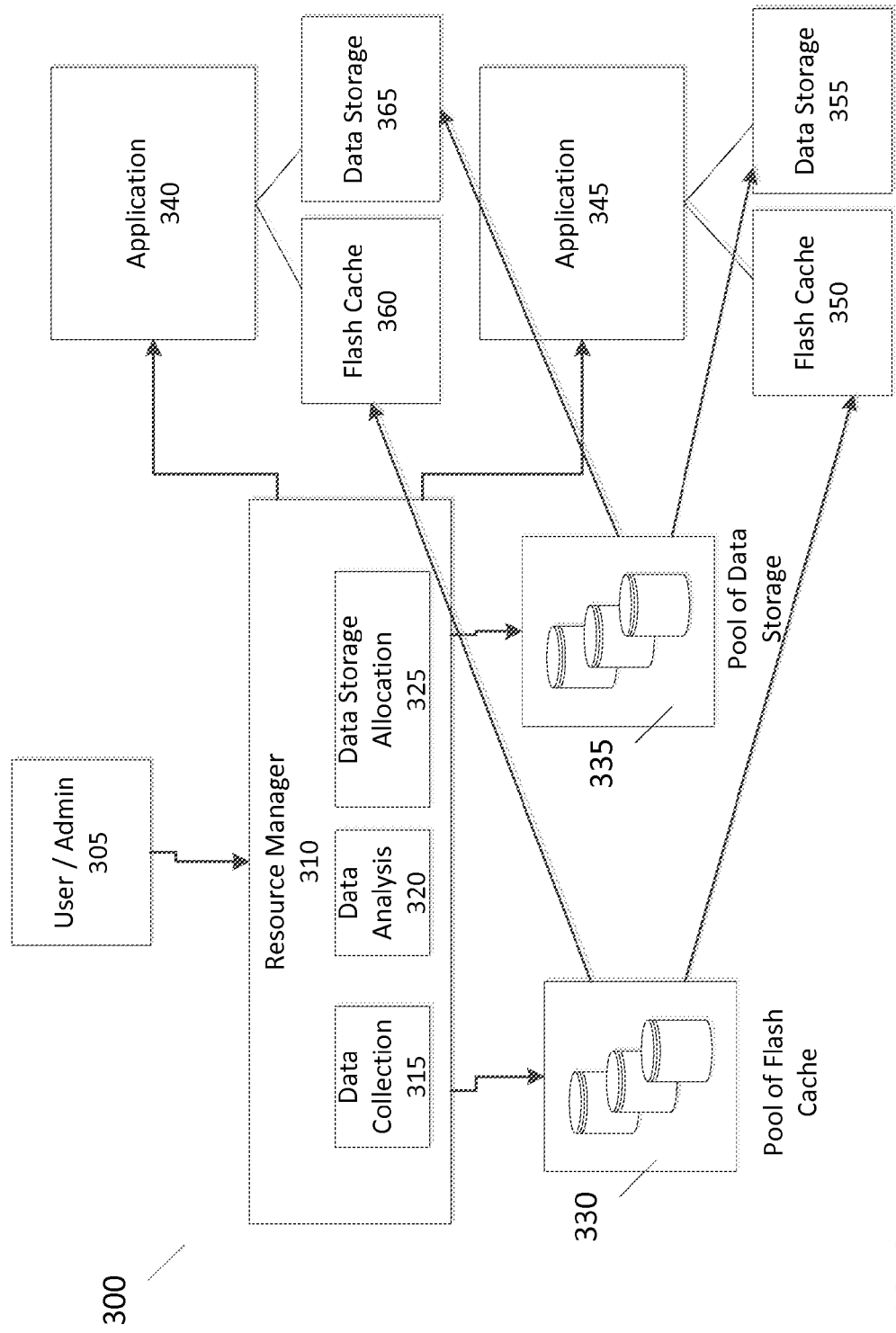
FIG. 3 is a further alternative simplified illustration of a data storage system managing flash cache and storage, in accordance with an embodiment of the present disclosure.

Refer to the example embodiment of FIG. 3. FIG. 3 illustrates an example embodiment of data storage system. As shown, resource manager 310 is enabled to manage pool of flash cache 330, pool of data storage 335, and applications 340, 345. In this embodiment, resource manager 310 allocated flash cache 360 from pool of flash cache 330 to be used by application 340. Resource manager 310 allocated data storage 365 from pool of data storage 335 to be used by application 340. Similarly, resource manager 310 allocated flash cache 350 from pool of flash cache 330 for use by application 345 and resource manager 310 allocated data storage 355 from pool of data storage 335 for use by application 345. In many embodiments, resource manager may manage allocation of flash cache. In some embodiments, resource manager may manage allocation of flash cache and data storage.

Figures 4, 5:
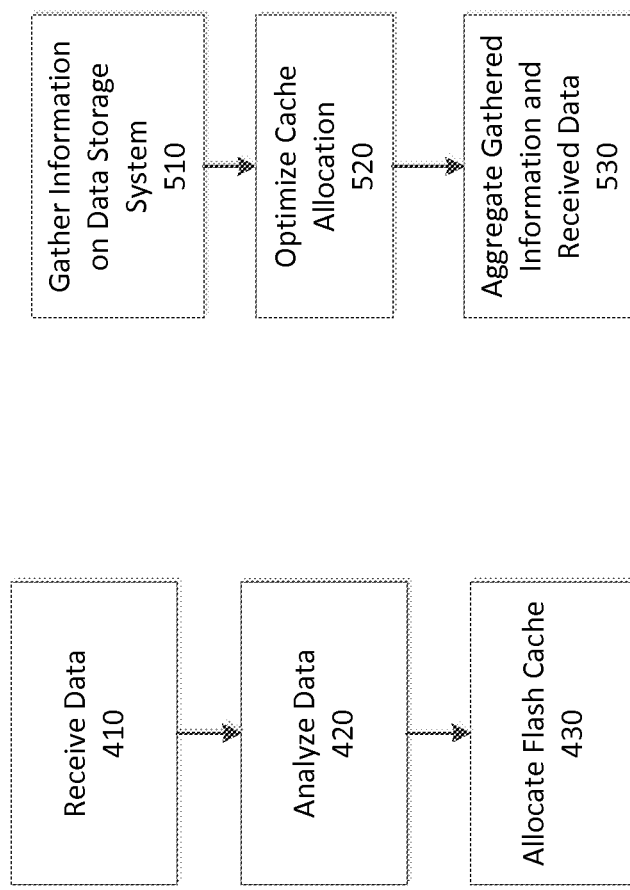
FIG. 4 is an example embodiment of a method of allocating flash cache in a data storage system, in accordance with an embodiment of the present disclosure.
FIG. 5 is a simplified illustration of a method optimizing an allocation of flash cache in a data storage system, in accordance with an embodiment of the present disclosure.

Refer to the example embodiments of FIGS. 3 and 4. FIG. 4 illustrates a simplified flow of how data storage system manages flash cache and data storage as shown in FIG. 3. Data storage system 300 manages pool of flash cache 330 and pool of data storage 335 based on priority information received from User/Administrator 305. As shown, resource manager 310 receives data (Step 410) from User/Administrator 210 containing priority information pertaining to Applications 340, 345. Resource manager 310 analyzes the received data using data analysis module 320 (Step 420) to determine an optimal configuration and allocation of pool of flash 330 and pool of data storage 335 for application 340 and application 345. As shown, data storage allocation 325 module allocates flash cache 360 from pool of flash cache 330 and data storage 365 from pool of data storage to application 340 (Step 420). Data storage allocation module 325 allocates flash cache 350 from pool of flash cache 330 and data storage 355 from pool of data storage 335 to application 345 (Step 420).

Refer to the example embodiments of FIGS. 2 and 5. FIG. 5 illustrates a simplified flow of how data storage system analyzes gathered and received information and allocates an optimized configuration of flash cache for each application. Resource manager 220 receives message 212 containing priority information related to applications 260, 270. As shown, resource manager 220 gathers information on data storage system 200 (Step 510). Resource manager 220 sends query messages 214, 222 to application 260, 270 to determine application requirements and the configuration of data storage system 200. In this embodiment, data analysis module 230 optimizes cache allocation (Step 520) by using a cache algorithm to analyze the configuration of the data storage system 200 and received priority information contained in message 212. Data analysis module 230 uses the cache algorithm to aggregate the gathered information and received priority information to determine an optimized allocation of flash cache for applications 260, 270 (Step 530). In this embodiment, resource manager 220 is enabled to allocate an optimized amount of pool of flash cache 280 and an amount of pool of data storage for applications 260, 270.

Figure 6:
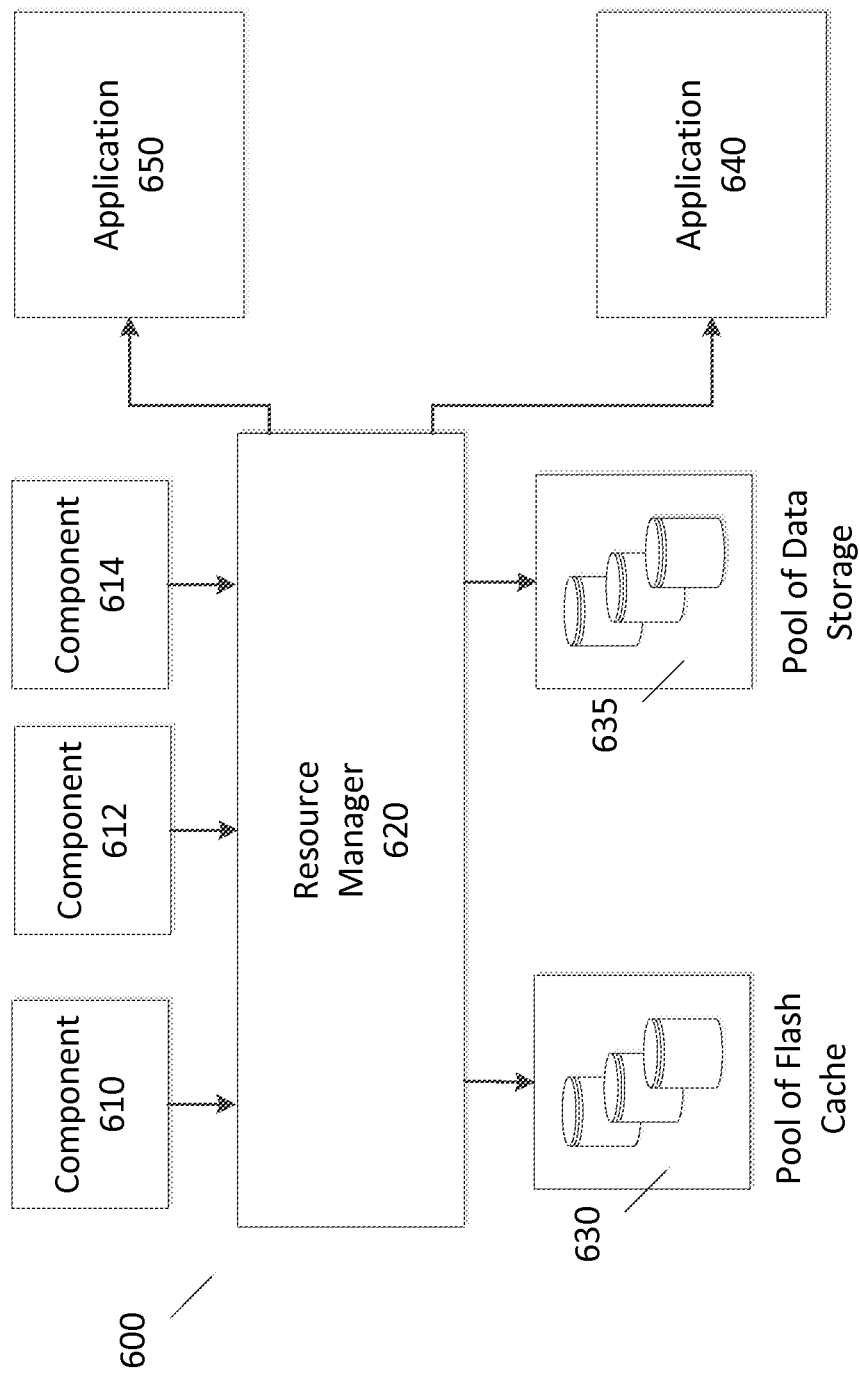
FIG. 6 is a simplified illustration of a data storage system configured to receive priority information from components in the data storage system, in accordance with an embodiment of the present disclosure.

Refer to the example embodiment of FIG. 6. FIG. 6 illustrates an example embodiment of data storage system coupled to one or more components. As shown, data storage system 600 manages applications 650, 640, pool of flash cache 630, and pool of data storage 635. In this embodiment, resource manager 620 receives priority information from components 610, 612, 614 pertaining to the priority of application 650 and application 640. In various embodiments, a resource manager may receive priority information from both components and/or users.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 7:
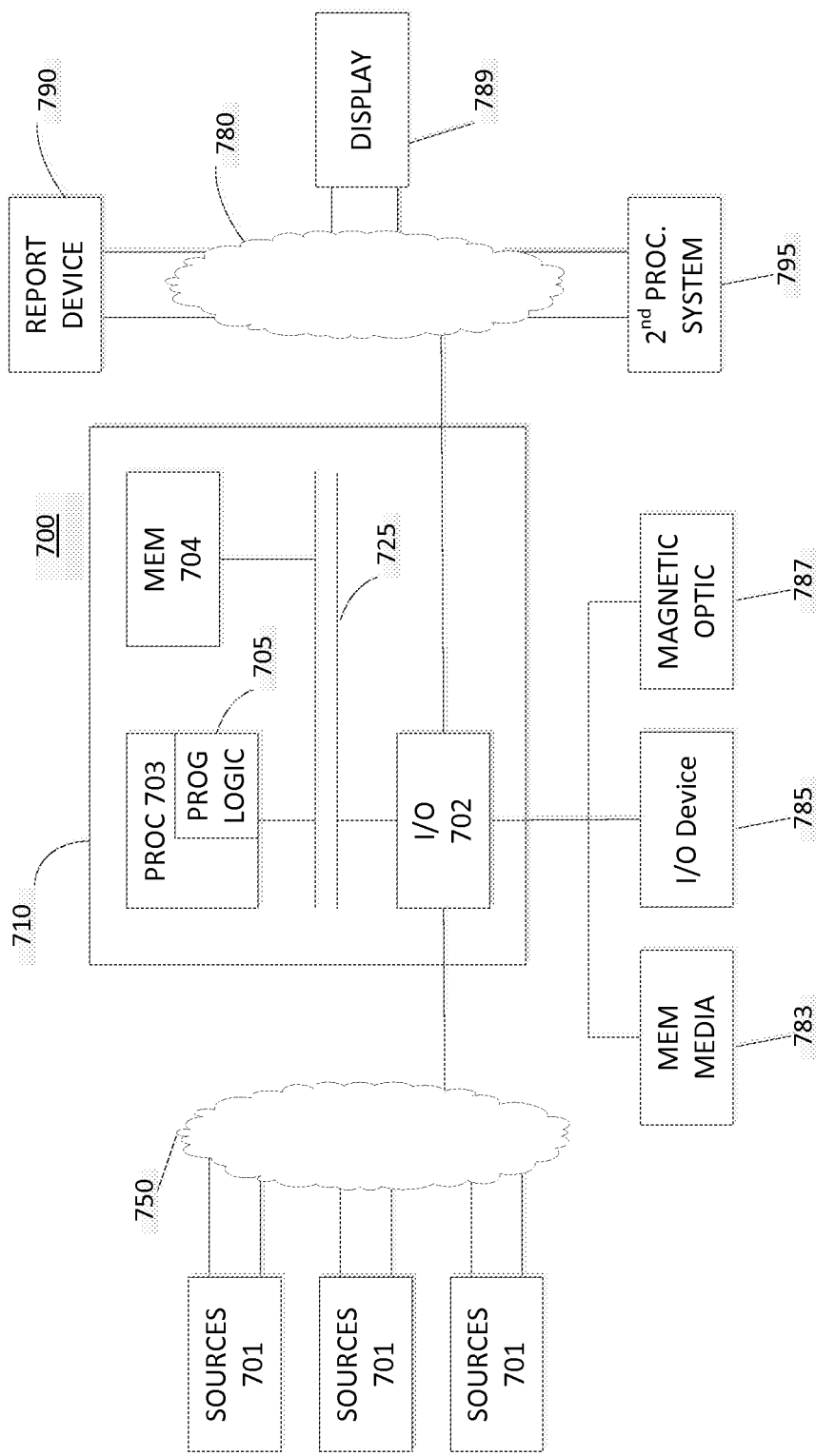
FIG. 7 is an example of an embodiment of an apparatus that may utilize the techniques described herein, in accordance with an embodiment of the present disclosure.

FIG. 7 is a block diagram illustrating an apparatus, such as a computer 710 in a network 700, which may utilize the techniques described herein according to an example embodiment of the present invention. The computer 710 may include one or more I/O ports 702, a processor 703, and memory 704, all of which may be connected by an interconnect 725, such as a bus. Processor 703 may include program logic 705. The I/O port 702 may provide connectivity to memory media 783, I/O devices 785, and drives 787, such as magnetic or optical drives. When the program code is loaded into memory 704 and executed by the computer 710, the machine becomes an apparatus for practicing the invention. When implemented on one or more general-purpose processors 703, the program code combines with such a processor to provide a unique apparatus that operates analogously to specific logic circuits. As such, a general purpose digital machine can be transformed into a special purpose digital machine.

Figure 8:
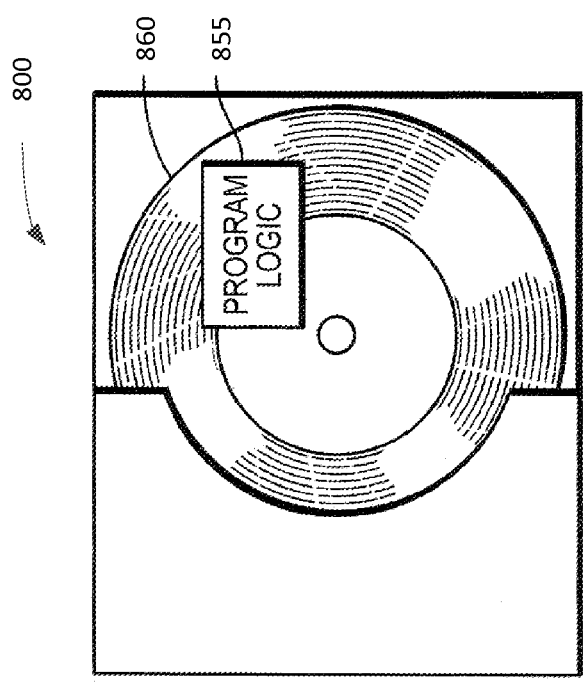
FIG. 8 is an example of a method embodied on a computer readable storage medium that may utilize the techniques described herein, in accordance with an embodiment of the present disclosure.

FIG. 8 is a block diagram illustrating a method embodied on a computer readable storage medium 860 that may utilize the techniques described herein according to an example embodiment of the present invention. FIG. 8 shows Program Logic 855 embodied on a computer-readable medium 860 as shown, and wherein the Logic is encoded in computer-executable code configured for carrying out the methods of this invention and thereby forming a Computer Program Product 800. Program Logic 855 may be the same logic 705 on memory 704 loaded on processor 703 in FIG. 7. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing one or more resources on a data storage system having one or more data storage devices coupled to a pool of flash cache, the computer-executable method comprising:
    receiving data related to a first one of the one or more resources;
    analyzing the data to determine a priority for the first one of the one or more resources; and
    based on the determined priority, allocating an amount of flash cache from the pool of flash cache to the first one of the one or more resources.

2. The computer-executable method of claim 1, wherein the received data comprises a level of priority of the first one of the one or more resources.

3. The computer-executable method of claim 2, wherein the received data further comprises a time at which the level of priority is valid.

4. The computer-executable method of claim 1, further comprising collecting information about the data storage system.

5. The computer-executable method of claim 4, wherein the analyzing comprises:
    based on the received data, optimizing the amount of cache for the first one of the one or more resources using a caching algorithm; and
    aggregating the collected information and the optimized amount of cache to determine the priority.

6. The computer-executable method of claim 5, wherein the caching algorithm comprises minimizing an expected response time for the first one of the one or more resources.

7. The computer-executable method of claim 4, wherein the collected information comprises a response time for the first one of the one or more resources.

8. The computer-executable method of claim 4, wherein the collected information comprises a number of read misses for the first one of the one or more resources.

9. A system, comprising:
    one or more data storage arrays coupled to a pool of flash cache enabled to provide data storage for one or more resources; and
    computer-executable logic encoded in memory of one or more computers, having one or more processors, in communication with the one or more data storage arrays, wherein the computer-executable logic is configured for the execution of:

receiving data related to a first one of the one or more resources;

analyzing the data to determine a priority for the first one of the one or more resources; and based on the determined priority, allocating an amount of flash cache from the pool of flash cache to the first one of the one or more resources.

10. The system of claim 9, wherein the received data comprises a level of priority of the first one of the one or more resources.

11. The system of claim 10, wherein the received data further comprises a time at which the level of priority is valid.

12. The system of claim 9, further comprising collecting information about the data storage system.

13. The system of claim 12, wherein the analyzing comprises:

based on the received data, optimizing the amount of cache for the resource using a caching algorithm; and aggregating the collected information and the optimized amount of cache to determine the priority.

14. The system of claim 13, wherein the caching algorithm comprises minimizing an expected response time for the first one of the one or more resources.

15. The system of claim 12, wherein the collected information comprises a response time for the first one of the one or more resources.

16. The computer-executable method of claim 12, wherein the collected information comprises a number of read misses for the first one of the one or more resources.

17. A computer program product for managing one or more resources on a data storage system having one or more data storage devices coupled to a pool of flash cache, the computer program product comprising:

a non-transitory computer readable medium encoded with computer-executable program code for using read signatures in replication, the code configured to enable the execution of:

receiving data related to a first one of the one or more resources;

analyzing the data to determine a priority for the first one of the one or more resources; and based on the determined priority, allocating an amount of flash cache from the pool of flash cache to the first one of the one or more resources.

18. The computer program product of claim 17, wherein the received data comprises a level of priority of the first one of the one or more resources.

19. The computer program product of claim 18, wherein the received data further comprises a time at which the level of priority is valid.

20. The computer program product of claim 17, further comprising collecting information about the data storage system.

21. The computer program product of claim 20, wherein the analyzing comprises:

based on the received data, optimizing the amount of cache for the resource using a caching algorithm; and aggregating the collected information and the optimized amount of cache to determine the priority.

22. The computer program product of claim 21, wherein the caching algorithm comprises minimizing an expected response time for the first one of the one or more resources.

23. The computer program product of claim 20, wherein the collected information comprises a response time for the first one of the one or more resources.

24. The computer program product of claim 20, wherein the collected information comprises a number of read misses for the first one of the one or more resources.

* * * * *